United States Patent [19]

Ito et al.

[11] 4,190,614
[45] Feb. 26, 1980

[54] METHOD FOR THE PRODUCTION OF LOW DENSITY COPOLYMERS OF ETHYLENE

[75] Inventors: Akira Ito; Kenji Iwata, both of Yokohama, Japan

[73] Assignee: Mitsui Toatsu Chemicals, Incorporated, Tokyo, Japan

[21] Appl. No.: 784,308

[22] Filed: Apr. 4, 1977

[30] Foreign Application Priority Data

Apr. 13, 1976 [JP] Japan .................................. 51-40888

[51] Int. Cl.$^2$ ...................... C08F 4/02; C08F 255/02
[52] U.S. Cl. ...................... 525/106; 526/65; 526/73; 526/115; 526/124; 526/125; 526/348; 526/348.6; 526/904
[58] Field of Search ................ 260/878 B; 526/124, 526/125

[56] References Cited

U.S. PATENT DOCUMENTS

| | | | |
|---|---|---|---|
| 3,067,183 | 12/1962 | Hagemeger et al. | 526/159 |
| 3,780,136 | 12/1973 | Khelghatian et al. | 260/878 B |
| 3,888,835 | 6/1975 | Ito et al. | 526/125 |
| 3,893,989 | 7/1975 | Leicht et al. | 526/73 |
| 3,987,233 | 10/1976 | Sato et al. | 526/124 |
| 3,993,588 | 11/1976 | Thukral | 526/124 |

FOREIGN PATENT DOCUMENTS

| | | | |
|---|---|---|---|
| 2022414 | 7/1970 | France | 526/904 |
| 960232 | 6/1964 | United Kingdom | 526/159 |
| 1300734 | 12/1972 | United Kingdom | 526/903 |
| 1384603 | 2/1975 | United Kingdom | 526/903 |

*Primary Examiner*—Edward J. Smith
*Attorney, Agent, or Firm*—Sughrue, Rothwell, Mion, Zinn and Macpeak

[57] ABSTRACT

In producing a low density polyethylene by a slurry copolymerization of ethylene and an α-olefin with use of a catalyst consisting of a magnesium compound-supported titanium and/or vanadium compound and an organoaluminum compound, a certain amount of ethylene is subject to a pre-polymerization in the presence of said catalyst prior to the copolymerization. Successively, the slurry copolymerization of ethylene and an α-olefin is effected in a low-boiling diluent to obtain a low density polyethylene of 0.925–0.950 in density, covering various grades in a wide range.

11 Claims, No Drawings

METHOD FOR THE PRODUCTION OF LOW DENSITY COPOLYMERS OF ETHYLENE

BACKGROUND OF THE INVENTION

This invention relates to a method for the production of a low density polyethylene by a slurry copolymerization of ethylene and an α-olefin.

It is well-known in the art that polyethylene is produced by effecting a slurry polymerization in the presence of such hydrocarbons as hexane and heptane at temperatures of not more than 100° C., at which the resulting polymer is not dissolved, or by effecting a solution polymerization at temperatures of more than 100° C., usually 130° C. or more, at which the resulting polymer is dissolved. Hereinafter, the former is referred to as a slurry process and the latter as a solution process.

Various grades of polyethylene have been produced in a commercial scale by controlling the molecular weight and density of a polymer in accordance with its uses. It has, however, been impossible to provide polyethylene covering various grades in a wide range by the slurry process alone or the solution process alone.

As reported in, for example, Chemical Economy & Engineering Review, 7, 24–40 (1975), the above two processes are used properly depending on the desired grades.

The relation between grades which are defined by the density and melt index of polyethylene and the production process therefor is summarized from the above-mentioned literature as shown in Table 1.

Table 1

| Density, g/ml | Melt Index | | |
|---|---|---|---|
| | More than 1.0 | 1.0–0.1 | Less than 0.1 |
| 0.945–0.970 | Slurry process | Slurry process | Slurry process |
| | Solution process | Solution process | |
| Less than 0.945 | Solution process | Solution process | Impossible to produce |

It is well-known that melt index of polyethylene can be controlled depending on polymerization conditions and amount of a molecular weight modifier (for example, hydrogen) used in the polymerization, and that density of polyethylene can be controlled by copolymerizing ethylene with an α-olefin.

In the production of a high density polyethylene (higher than 0.945 g/ml) by the slurry process, the resulting polymer is insoluble in a polymerization solvent and therefore, the viscosity of a polymerization system is not directly affected by the molecular weight of a polymer. Accordingly, polymers of from higher molecular weight (lower melt index) to lower molecular weight (higher melt index) can be obtained. However, in the event of producing a low density polyethylene by the slurry process through a copolymerization of ethylene with an α-olefin, there are many troubles that the viscosity of a polymerization system increases due to the formation of polymers soluble in the polymerization solvent and the swelling of the resulting polymer results in the lowering of bulk density and the stickiness of filter cakes.

Under such troubles, it is very difficult to conduct the production in commercial scale conveniently. Therefore, the grades of polyethylene which can be produced by the conventional slurry process are limited to those having a density of 0.945–0.970 g/ml and a melt index of 0.01–40. In effect, the so-called, Ziegler method's polyethylene which is mainly produced by the slurry process is named a high density polyethylene.

In the refining of a polymer containing slurry obtained in the slurry process with use of the known catalyst consisting of titanium trichloride and an organoaluminum compound, the after-treatment of decomposing the catalyst and then removing it by washing requires a long time, and during the time the viscosity of the polymer slurry increases and the bulk density of the polymer lowers. Thus, the use of supported catalysts has been proposed to obtain the polymer slurry of a good property, having no need of the complicated after-treatment. For example, US Pat. No. 3,888,835 discloses a process for the polymerization of ethylene, in which a high activity catalyst having a titanium compound supported with a magnesium compound is used and such a low-boiling hydrocarbon as butane is used as a diluent for polymerization.

However, when this process applies to the production of the low density polyethylene having a density of 0.935 g/ml or less through copolymerization of ethylene with an α-olefin, the resulting polymer is lowered in bulk density and it is difficult to obtain the polymer slurry of a good property. The lowering of bulk density brings about troubles in handling of the slurry, such as stirring, transferring, filtrating, drying and storing. For example, if the resulting polymer is reduced in bulk density in the polymerization step, the formation of bulky polymers results in insufficient agitation and accordingly, in lowering of the diffusion velocity of ethylene so that the apparent polymerization velocity is extremely reduced in spite of the catalytic activity being still sustained. Also, since the bulky polymers adsorb the solvent used, the pump conveyance and filtration of the slurry can not efficiently be conducted. For avoiding such troubles, the polymer slurry must be diluted with a large amount of solvent and as a result, contains such as a polymerization vessel and a storing vessel and installations for the recovery step of the solvent used and for the refining step are run on an extensive scale which is extremely disadvantageous economically.

SUMMARY OF THE INVENTION

An object of this invention is to provide a method for the production of a low density polyethylene of 0.925–0.950 g/ml in density, covering a melt index in a wide range by the slurry process.

Another object of this invention is to provide a method for the production of the low density polyethylene by copolymerization of ethylene with an α-olefin, having substantially the same order in bulk density as one of an ethylene homopolymer obtained by the slurry process.

A further object of this invention is to provide a low density polyethylene slurry having a good property and having no need of the complicated after-treatment.

A still further object of this invention is to provide the low density polyethylene of 0.925–0.950 g/ml in density and of less than 0.1 in melt index.

In accordance with this invention, there is provided a method for the production of the low density polyethylene of 0.925–0.950 g/ml in density by copolymerizing ethylene and an α-olefin in the slurry process, which comprises:

(1) using a catalyst consisting of (A) titanium and/or vanadium compounds supported with a magnesium compound and (B) an organoaluminum compound, (2) subjecting ethylene to a pre-polymerization in a liquid diluent in the presence of said catalyst prior to the copolymerization, the amount of ethylene to be pre-polymerized being more than 50 g per 1.0 g of said catalyst component (A) and not more than 20% by weight of the entire amount of the ethylene and α-olefin monomers to be polymerized, and (3) successively, conducting the copolymerization of ethylene and an α-olefin at temperatures of not higher than 100° C. in the presence of a low-boiling hydrocarbon diluent having a boiling point of not higher than 40° C.

DETAILED DESCRIPTION OF THE INVENTION

It has been found that a low density polyethylene covering various grades in a wide range can be obtained without the lowering of bulk density by subjecting a certain amount of ethylene to a pre-polymerization prior to the slurry copolymerization of ethylene and an α-olefin.

According to this invention, a polymer in slurry of good property having a bulk density of more than 0.35 g/ml is obtained and the bulk density is substantially the same as that of ethylene homopolymers obtained by the slurry process.

This invention has, therefore, the great advantages that there are no troubles in handling of the slurry, such as stirring, transferring, filtrating, drying, and storing, which are usually conducted in the production method of polyethylene by the slurry process.

Further, this invention is epoch-making in that various grades in a very wide range, including the low density polyethylene of less than 0.1 in melt index, the production of which has been hitherto impossible in either the slurry process or the solution process as mentioned above can be covered by an one single process, i.e. the slurry process alone.

The catalyst component (A) which may be used in the method of this invention is titanium and/or vanadium compounds supported with a magnesium compound.

The magnesium compound which may be used as a support includes, for example, magnesium oxide, magnesium carbonate, basic magnesium carbonate, magnesium sulphate, magnesium hydroxide, magnesium hydroxychloride, magnesium chloride, magnesium bromide, dialkoxymagnesium and magnesium carboxylic acid salts, and their double salts with other metal compounds such as alumimum oxide and boron oxide, and mixtures of these magnesium compounds with metal compounds such as iron hydroxide, aluminum chloride and aluminum hydroxide or with organic compounds such as alcohols, ketones, amines and esters.

The titanium and/or vanadium compounds which may be used for the preparation of the catalyst component (A) are those used as the transition metal component of the Ziegler catalyst and the typical examples include titanium tetrachloride, titanium trichloride, titanium haloalkoxide, vanadium tetrachloride and vanadyl trichloride.

The catalyst component (A) may be prepared by supporting the titanium and/or vanadium compound with the support in accordance with the known process for the preparation of supported catalysts used in the Ziegler catalyst. There are, for example, used the process for supporting by reacting the support with liquid titanium and/or vanadium compound while heating, or co-pulverizing the support with the titanium and/or vanadium compounds. A third component other than the magnesium component may be added in the co-pulverizing of the magnesium component and the titanium and/or vanadium component. For such an additive, siloxane polymers and an aluminum halide-ether complex are particularly preferred.

The organoaluminum compounds which may be used for the catalyst component (B) are represented by the formula, $$Al\ R_n X_{3-n}$$

wherein R is a hydrocarbon residue, X is hydrogen, halogen or an alkoxy group and n is 1 to 3. The typical examples include trimethylaluminum, triethylaluminum, triisobutyl-aluminum, diethylaluminum monochloride, diethylaluminum monohydride, diethylaluminum monoethoxide and ethylaluminum monoethoxymonochloride.

The component (B) is used within the range of 1 to 1000 mols, preferably 2 to 500 mols based on 1 mol of the component (A).

In the copolymerization according to this invention, a low-boiler hyrocarbon diluent having a boiling point of not higher than 40° C. is used. Examples of the diluent include propane, n-butane, iso-butane, n-pentane, isopentane, cyclopropane, cyclobutane and mixtures thereof and particularly, propane, n-butane and iso-butane are preferred.

α-Olefins which may be used in the copolymerization with ethylene are represented by the formula, $$R'-CH=CH_2$$

wherein R' is a hydrocarbon resiude of 1 to 10 carbon atoms. Examples of α-olefins are propylene, butene-1, pentene-1, hexen-1, 4-methyl-pentene-1 and styrene. The amount of α-olefin to be copolymerized with ethylene is within such a range that the density of the resulting copolymer is controlled to the extent of 0.925 to 0.950 g/ml. Although the amount varies depending on the type of α-olefins, it is usually within the range of about 0.5 to 12% by weight of the final copolymer.

The pre-polymerization according to this invention is conducted by polymerizing ethylene in the amount of more than 50 g per 1 g of the component (A) and not more than 20% by weight of the entire amount of the monomers to be polymerized (i.e. the total of the monomer amount to be pre-polymerized and the amount of the monomers to be co-polymerized) in the presence of the catalyst consisting of the components (A) and (B). Although the upper limit of the ethylene amount to be pre-polymerized varies depending on the type of α-olefins, the type of catalyst components and the desired grade of copolymers, 3000 g per 1 g of component (A) is preferred. If the prepolymerization amount of ethylene is 50 g or less, the resulting polymer is reduced in bulk density and deteriorated in the slurry property so that the industrial production gets into troubles.

On the other hand, if the pre-polymerization amount is over 20% by weight of the entire amount of polymerization, the obtained polymer is deteriorated in a lowmelting property, flexibility and transparency, all of which are the distinctive qualities of the low density polyethylene.

The liquid diluent for pre-polymerization is not particularly limited, and the liquid diluents which are usually used in the polymerization of olefins may be used. The low-boiling hydrocarbons which are used in the copolymerization of this invention as mentioned above may be also used as the diluent for pre-polymerization. When the high-boiling liquid hydrocarbon such as hexane and heptane is used in the pre-polymerization, it should be at an amount of less than 10 weight % of the low-boiling hydrocarbon which is used as the diluent for copolymerization.

The pre-polymerization temperature, pressure and time are not particularly limited. The pre-polymerization is usually conducted at temperature of 20° C. to 100° C. under pressure of reduced pressures to 40 atm. The polymerization time normally is between several minutes and several hours.

After the completion of pre-polymerization, the copolymerization may be conducted using the usual manner known in the art except the specifically defined conditions as mentioned above. The polymerization temperature may range from 20° C. to 100° C., preferably from 40° C. to 95° C., while the pressure may range from normal pressure to 100 atms and usually is between normal pressure and 70 atms.

If the copolymerization after the pre-polymerization is conducted using the high-boiling hydrocarbon diluent such as hexane and heptane instead of the low-boiling hydrocarbon (for example, propane and n-butane) as defined hereinbefore, the resulting polymer is dissolved in or swelled with the diluent and thus, the slurry property deteriorates so that such procedures as filtration get into trouble (see Comparative Example 2 mentioned hereinafter). Thus, the purpose of effectively producing the low density polyethylene on a commercial scale can not be attained.

It is necessary for attainment of the purposes of this invention to fullfill the three requirements as defined hereinbefore:

(1) using the supported catalyst component (A) of a high activity, (2) conducting the pre-polymerization of ethylene prior to the copolymerization and (3) using the low-boiling hydrocarbon having a boiling point of not higher than 40° C. as the diluent for copolymerization.

In the practice of this invention, the molecular weight of the polymer varies depending on the mode of polymerization, type of catalysts and other polymerization conditions, but it may be controlled by the addition of, for example, hydrogen or dialkyl zinc, if necessary.

As mentioned above, the low density polyethylene as desired can be obtained by pre-polymerizing a certain amount of ethylene in the presence of catalyst components (A) and (B) and successively copolymerizing ethylene and an α-olefin. It should be, however, pointed out that the catalyst component (A) is not to be newly added in the copolymerization step. If the component (A) is added in the copolymerization step, the resulting polymer becomes viscous and is reduced in bulk density so that the desired effects can be obtained. On the other hand, the catalyst component (B) may be newly added in the copolymerization step, if necessary.

The low density polyethylene slurry obtained by this invention does not need the complicated after-treatment which is normally practiced for the polyethylene slurry obtained with use of the conventional catalyst consisting of titanium trichloride and an organoaluminum compound. By only vapourizing the low-boiling hydrocarbon diluent, the polymer product can be obtained in form of powders and therefore, the production process is simplified. Polymers dissolved in part in the diluent, if any, can be also used for products in that condition and accordingly, this invention is exceedingly useful in that all of the polymers obtained can be utilized.

This invention will be illustrated by the following non-limitative examples.

EXAMPLE 1

23.1 g of magnesium chloride, 2.4 g of titanium tetrachloride and 4.5 g of aluminum chloride-diphenyl ether complex were charged into a 600 ml capacity vibration mill containing about 80 steel balls of 12 mm in diameter under nitrogen atmosphere and pulverized at room temperature for 14 hours. The resulting powders were separated from the steel balls under nitrogen atmosphere to obtain an activated titanium composition with a Ti content of 2.0 weight % (catalyst component (A)). 0.04 g of the component (A) and 1 ml of triethylaluminum as catalyst component (B) were charged together with 50 ml of n-heptane into a glass reactor under nitrogen atmosphere, in which 2.5 g of ethylene were then subjected to a pre-polymerization at room temperature while stirring. The product mixture thus obtained is, hereinafter, referred to as a pre-polymer slurry.

Amount of ethylene pre-polymerized: 62.5 g/g.component (A).

Next, the entire amount of the pre-polymer slurry above obtained was charged into a 6 l capacity stainless steel autoclave under nitrogen atmosphere and then the nitrogen atmosphere was replaced with a 3:7 mixture of n-butane and iso-butane (hereinafter, referred to as mere butane), and thereafter, 1.3 kg of butane were charged.

Then, 300 g of butene-1 were charged into the autoclave and hydrogen was charged until the partial pressure of hydrogen reached 3 kg/cm$^2$G. Ethylene was then fed and polymerized under a pressure of 25 kg/cm$^2$G (partial pressure of ethylene, about 10 kg/cm$^2$ Abs.) at 80° C. for 2 hours. After the purging of the butane and unreacted ethylene and butene-1, 1008 g of an ethylene-butene-1 copolymer (butene-1 content, 9.6 weight %) were obtained.

Intrinsic viscosity (tetralin, 135° C.): 1.20 dl/g
Bulk density: 0.40 g/ml
Number of ethyl groups: 24.3/1000 carbon atoms
Density at 23° C: 0.926 g/ml
MI (Melt Index), measured according to ASTMD-1238-65T (Test Condition E): 6.6

The polymerization activity of the catalyst in this polymerization reaction was 12.6 kg/g.(A).hr wherein the symbol "(A)" means the catalyst component (A) or 630 kg/g.Ti.hr and the yield of polymer was 25.2 kg/g.(A) or 1260 kg/g.Ti.

Since the amount of pre-polymerization was 2.5 g and the entire amount of polymerization was 1008 g, the ratio of the pre-polymerization amount to the entire polymerization amount was 0.25 wt.%.

EXAMPLE 2

Copolymerization of ethylene and propylene was conducted using the equal amount of the pre-polymer slurry prepared in Example 1.

In the same procedure as Example 1, the equal amount of the pre-polymer slurry, 1.3 kg of butane and hydrogen (pressure, 3 kg/cm²) were fed into the 6 l autoclave and then, a gaseous mixture of ethylene and propylene was charged into the autoclave in which the mol ratio of propylene to ethylene in gas phase was adjusted to 0.15. Polymerization was conducted at the same temperature and pressure as in Example 1.

After 2.3 hours for polymerization, 1,075 g of a polyethylene copolymer (propylene content, 9.9 weight %) were obtained.

Intrinsic viscosity: 1.32 dl/g
Bulk density: 0.42 g/ml
Number of methyl groups: 30.3/1000 carbon atoms
Density: 0.927 g/ml
MI: 5.3
Polymerization activity of catalyst:
11.7 kg/g.(A).hr or 584 kg/g.Ti.hr
Yield of polymer:
26.9 kg/g.(A) or 1342 kg/g.Ti The ratio of the pre-polymerization amount to the entire polymerization amount was 0.25 weight %.

EXAMPLE 3

The pre-polymerization and oopolymerization were conducted in the same procedure as Example 1 except that the component (A) was prepared from 2.4 g of AA type titanium trichloride (manufactured by Stauffer Co., USA), 23.1 g of magnesium chloride and 4.5 g of aluminum chloridediphenylether complex.

After 2.6 hours for copolymerization, 1,012 g of a polyethylene copolymer (butene-1 content, 6.5 wt.%) were obtained.

Intrinsic viscosity: 1.10 dl/g
Bulk density: 0.40 g/ml
Number of ethyl groups: 19.7/1000 carbon atoms
Density: 0.927 g/ml
MI: 13.5
Polymerization activity of catalyst: 9.7 kg/g.(A).hr or 504 kg/g.Ti.hr
Yield of polymer: 25.2 kg/g.(A) or 1310 kg/g.Ti The ratio of the pre-polymerization amount to the entire polymerization amount was 0.25 weight %.

EXAMPLE 4

The pre-polymerization and copolymerization were conducted in the same procedure as Example 1 except that 2 ml of triisobutyl aluminum were used instead of triethyl aluminum as component (B).

After 2 hours for copolymerization, 1088 g of a polyethylene copolymer (butene-1 content 7.9 wt.%) were obtained.

Intrinsic viscosity: 1.12 dl/g
Bulk density: 0.40 g/ml
Number of ethyl groups: 20.3/1000 carbon atoms
Density: 0.926 g/ml
MI: 13.0
Catalytic activity: 13.6 kg./g.(A).hr or 680 kg/g.Ti.hr
Yield: 27.2 kg/g.(A) or 1360 kg/g.Ti The amount of pre-polymerization was 62.5 g/g.(A) and the ratio of the pre-polymerization amount to the entire polymerization amount was 0.23 weight %.

Comparative Example 1

For comparison the copolymerization of ethylene and butene-1 was conducted in the same procedure as Example 1 except that the components (A) and (B) were direct charged into the autoclave without conducting the prepolymerization.

After one hour for polymerization, the polymerization velocity dropped extensively.

After two hours, 502 g of a polyethylene copolymer (butene-1 content 7.9 wt.%) were obtained.

Intrinsic viscosity: 1.28 dl/g
Number of ethyl groups: 20.3/1000 carbon atoms
Density: 0.928 g/ml
MI: 5.7
Catalytic activity: 6.3 kg/g.(A).hr or 313 kg/g.Ti.hr
Yield: 12.6 kg/g.(A) or 626 kg/g.Ti Though the resulting polymer particles were too sticky to exactly measure a bulk density, it gave about 0.23 g/ml.

As is apparent from Comparative Example 1, The omission of pre-polymerization results in the formation of sticky polymer particles and in the lowering of bulk density so that the industrial production encounters a difficulty. Also, the slurry property becomes worse and a diffusion rate of ethylene to butane is lowered so that the polymerization velocity and polymer yield are reduced extensively.

Comparative Example 2

For comparison copolymerization was conducted using n-heptane instead of butane as the diluent.

2 l of n-heptane, the equal amount of the pre-polymer slurry used in Example 1 and 300 g of butene-1 were charged into a 5 l capacity autoclave and hydrogen was fed up to a partial pressure of 3 kg/cm², and then, ethylene was fed until a polymerization pressure reached 15 kg/cm²G (partial pressure of ethylene, about 10 kg/cm² Abs). Polymerization was conducted at 75° C. After an hour, the absorption of ethylene finished practically and then the polymerization was discontinued.

The reaction product was a remarkably viscous polymer slurry so that it was difficult to advance such treatments as filtration.

By vapourizing n-heptane from this polymer slurry, 410 g of a block polymer (butene-1 content, 7.7 wt.%) were obtained.

Number of ethyl groups: 19.8/1000 carbon atoms
Density: 0.926 g/ml
Bulk density: impossible to measure.

The ratio of the pre-polymerization amount to the entire polymerization amount was 0.61 wt.%

The Comparative Examples 1 and 2 show that the effects of this invention can not be attained in the absence of the two requirements i.e. using the specifically defined diluents and conducting the pre-polymerization.

EXAMPLE 5

0.04 g of the activated titanium composition used in Example 1, 1 ml of triethyl aluminum and 1.3 kg of butane were charged into a 6 l capacity autoclave, hydrogen was fed up to a partial pressure of 2 kg/cm², and then 5 g of ethylene were fed. Reaction was conducted at 40° C. for one hour and thus a pre-polymer slurry was prepared. The amount of ethylene pre-polymerized was 3.7 g (the prepolymerization amount, 92.5 g/g.(A)).

Next, 350 g of butene-1 were fed into the autoclave, then ethylene was fed and polymerized at 80° C. under the polymerization pressure of 25 kg/cm²G for 2 hours. 1,102 g of a polyethylene copolymer (butene-1 content 7.9 wt.%) were obtained.

Intrinsic viscosity: 1.57 dl/g
Bulk density: 0.41 g/ml
Density: 0.927 g/ml

Number of ethyl groups: 20.3/1000 carbon atoms
MI: 1.85
Catalytic activity: 13.8 kg/g.(A).hr or 689 kg/g.Ti.hr
Yield: 27.6 kg/g.(A) or 1378 kg/g.Ti.

The ratio of the pre-polymerization amount to the entire polymerization amount was 0.34 wt.%.

EXAMPLE 6

In accordance with the manner of Example 1, an activated titanium composition with a 2.0 wt.% Ti content (component (A)) was prepared from 23.1 g of magnesium chloride, 2.4 g of titanium tetrachloride and 4.5 g of dimethylpolysiloxane having a viscosity of 100 centistokes.

Using 0.04 g. of the component (A), a pre-polymer slurry was prepared in the same manner as Example 1. The amount of pre-polymerization: 62.5 g/g.(A). Next, copolymerization of ethylene and butene-1 was conducted in the same manner as Example 1.

After 2 hours, 806 g of a polyethylene copolymer (butene-1 content, 8.0 wt.%) were obtained.
Intrinsic viscosity: 1.21 dl/g
Bulk density: 0.40 g/ml
Number of ethyl groups: 20.4/1000 carbon atoms
Density: 0.926 g/ml
MI: 5.0
Catalytic activity: 10.1 kg/g.(A).hr or 504 kg/g.Ti.hr
Yield: 20.2 kg/g.(A) or 1008 kg/g.Ti
Ratio of pre-polymerization amount: 0.28 wt.%

EXAMPLE 7

The pre-polymerization and copolymerization were conducted in the same procedure as Example 1 except that the component (A) prepared in Example 6 and 2 ml of triisobutyl aluminum as component (B) were used. After 2 hours for polymerization, 870 g of a polyethylene copolymer (butene-1 content, 8.3 wt.%) were obtained.
Intrinsic viscosity: 1.12 dl/g
Bulk density: 0.40 g/ml
Number of ethyl groups: 21.2/1000 carbon atoms
Density: 0.927 g/ml
MI: 13.0
Catalytic activity: 10.9 kg/g.(A).hr or 545 kg/g.Ti.hr
Yield: 21.8 kg/g.(A) or 1090 kg/g.Ti.

The amount of pre-polymerization was 62.5 g/g.(A) and the ratio of the pre-polymerization amount to the entire polymerization amount was 0.29 wt.%.

Comparative Example 3

For comparison, copolymerization of ethylene and butene-1 was conducted in the same manner as Example 6 except that the pre-polymerization was omitted and the components (A) and (B) were direct charged into the autoclave. After one hour, the polymerization velocity dropped drastically.

After 2 hours for polymerization, 402 g of a polyethylene copolymer (butene-1 content 8.0 wt.%) were obtained.
Intrinsic viscosity: 1.26 dl/g
Number of ethyl groups: 20.5/1000 carbon atoms
Density: 0.927 g/ml
MI: 5.5

Though the resulting polymer particles were too sticky to measure a bulk density exactly, it gave about 0.23 g/ml.
Catalytic activity: 5.1 kg/g.(A).hr or 255 kg/g.Ti.hr
Yield: 10.1 kg/g.(A) or 505 kg/g.Ti
Ratio of pre-polymerization amount: 0.62 wt.%.

Comparative Example 4

The pre-polymer slurry prepared in Example 6 was used and copolymerization was conducted using n-heptane as a diluent.

2 l of n-heptane, the equal amount of the prepolymer slurry prepared in Example 6 and 300 g of butene-1 were charged into a 6 l capacity autoclave, hydrogen was fed up to a partial pressure of 3 kg/cm$^2$ and then, ethylene was fed until a polymerization pressure reached 15 kg/cm$^2$G (ethylene partial pressure, about 10 kg/cm$^2$ Abs), and polymerized at 75° C. After one hour for polymerization, the absorption of ethylene finished practically and then the polymerization was discontinued.

The reaction product was a very viscous polymer solution so that it was impossible to advance such procedures as filtration.

By vapourizing n-heptane from this polymer solution, 330 g of a polymer (butene-1 content 8.0 wt.%) were obtained.
Number of ethyl groups: 20.5/1000 carbon atoms
Density: 0,928 g/ml
Bulk density: impossible to measure
Ratio of pre-polymerization amount: 0.76 wt.%.

EXAMPLES 8-11

In accordance with Example 1, an activated titanium composition (component (A)) was prepared using TiCl$_4$, MgCl$_2$ and dimethylpolysiloxane (a linear polysiloxane) having a viscosity of 100 centistokes in amounts as indicated in Table 2.

The pre-polymerization and copolymerization of ethylene and butene-1 were conducted in the same manner as Example 5 except using the above activated titanium component and triisobutyl aluminum. The polymerization results are indicated in Table 2.

TABLE 2

| | Activated Titanium Composition [Catalyst Component (A)] | | | | | |
|---|---|---|---|---|---|---|
| | Composition, wt. % | | | | | |
| Example No. | TiCl$_4$ | MgCl$_2$ | Dimethylpoly-siloxane | Ti Content % | Amount g | Amount of Al (iso-butyl)$_3$ ml |
| 8 | 4.0 | 81.0 | 15.0 | 1.01 | 0.047 | 2.0 |
| 9 | 4.0 | 85.8 | 10.2 | 1.01 | 0.046 | 2.0 |
| 10 | 7.8 | 82.1 | 10.1 | 1.97 | 0.037 | 2.0 |
| 11 | 12.0 | 78.0 | 10.0 | 3.03 | 0.035 | 2.0 |

| Example No. | Yield of Polymer *(1) g | Catalytic Activity | | Yield of Polymer per g of Catalyst | | Bulk Density g/ml | Intrinsic Viscosity dl/g | Density g/ml | Ethyl Groups *(2) | MI | Amount of Pre-polymerization *(3) g/g · (A) |
|---|---|---|---|---|---|---|---|---|---|---|---|
| | | Kg/g · (A) · hr | Kg/g · Ti · hr | Kg/g · (A) | Kg/g · Ti | | | | | | |

TABLE 2-continued

| | | | | | | | | | | | |
|---|---|---|---|---|---|---|---|---|---|---|---|
| 8 | 533 (8.0) | 5.65 | 565 | 11.3 | 1130 | 0.40 | 1.28 | 0.926 | 20.5 | 5.0 | 78.7 (0.69) |
| 9 | 565 (7.8) | 6.15 | 615 | 12.3 | 1230 | 0.41 | 1.24 | 0.926 | 20.0 | 5.4 | 80.4 (0.65) |
| 10 | 820 (7.4) | 11.1 | 563 | 22.2 | 1126 | 0.40 | 1.27 | 0.927 | 19.0 | 5.0 | 100.0 (0.45) |
| 11 | 862 (8.0) | 12.3 | 410 | 24.6 | 820 | 0.41 | 1.21 | 0.926 | 20.5 | 5.6 | 105.7 (0.43) |

Notes:
*(1) The parentheses mean a butene-1 content (wt. %) of polymer.
*(2) The number per 1000 carbon atoms.
*(3) The parentheses mean the ratio of the pre-polymerization amount to the entire polymerization amount
The foregoing will also apply to Tables 2 and 3.

EXAMPLES 12-13

An activated titanium composition (component (A)) was prepared in the same manner as in Example 1 except that dimethylpolysiloxane in the type and amount as set forth in Table 3 was used instead of aluminum chloride-diphenylether complex.

The pre-polymerization and copolymerization of ethylene and butene-1 were conducted in the same manner as Example 5 except using the above activated titanium component and triisobutyl aluminum.

The polymerization results are indicated in Table 3.

the copolymerization system until the hydrogen partial pressure reached 0.1 kg/cm$^2$G.

After 1.75 hours for polymerization, 983 g of an ethylene copolymer (butene-1 content 7.5 wt.%) were obtained.

Intrinsic viscosity: 3.0 dl/g
Number of ethylene groups: 19.3/1000 carbon atoms
Density: 0.925 g/ml
Bulk density: 0.40 g/ml
MI: 0.07
Catalytic activity: 14.0 kg/g.(A).hr or 702 kg/g.Ti.hr
Yield: 24.5 kg/g.(A) or 1229 kg/g.Ti

TABLE 3

| | Activated Titanium Composition [Catalyst Component (A)] | | | | | |
|---|---|---|---|---|---|---|
| | Composition, wt. % | | | | | |
| Example No. | TiCl$_4$ | MgCl$_2$ | Dimethylpoly-siloxane | Ti Content % | Amount g | Amount of Al (iso-butyl)$_3$ ml |
| 12 | 8.0 | 82.0 | *(4) 10.0 | 2.00 | 0.035 | 2.0 |
| 13 | 8.2 | 81.5 | *(5) 10.3 | 2.07 | 0.036 | 2.0 |

Notes:
*(4) A cyclic dimethylpolysiloxane mixture having a viscosity of 13 centistokes (degree of polymerization 7-9).
*(5) A linear polysiloxane having a viscosity of 300 centistokes.

| Example Na- | Yield of Polymer *(1) g | Catalytic Activity Kg/g · (A) · hr | Kg/g · Ti · hr | Yield of Polymer per g of Catalyst Kg/g · (A) | Kg/g · Ti | Bulk Density g/ml | Intrinsic Viscosity dl/g | Density g/ml | Ethyl Groups *(2) | MI | Amount of Pre-polymerization *(3) g/g · (A) |
|---|---|---|---|---|---|---|---|---|---|---|---|
| 12 | 827 (8.0) | 11.8 | 590 | 23.6 | 1180 | 0.41 | 1.26 | 0.926 | 20.6 | 5.0 | 105.7 (0.45) |
| 13 | 831 (8.5) | 11.6 | 560 | 23.1 | 1116 | 0.40 | 1.25 | 0.926 | 21.6 | 5.0 | 102.8 (0.45) |

EXAMPLE 14

In this example, 100 g of ethylene were prepolymerized using 70° C. instead of 40° C. in the prepolymerization process of Example 5. Pre-polymerization amount: 2500 g/g. (A).

In the same manner as Example 5, then, polymerization was conducted using 350 g of butene-1. After 1.75 hours, 913 g of a polyethylene copolymer (butene-1 content 7.9 wt.%) were obtained.

Intrinsic viscosity: 1.11 dl/g
Number of ethyl groups: 20.3/1000 carbon atoms
Density: 0.925 g/ml
Bulk density: 0.37 g/ml
MI: 13.3
Catalytic activity: 13.0 kg/g.(A).hr or 650 kg/g.Ti.hr
Yield: 22.8 kg/g.(A) or 1138 kg/g.Ti
Ratio of pre-polymerization amount: 10.95 wt.%.

EXAMPLE 15

Polymerization was conducted in the same procedure as Example 1 except that hydrogen was charged into Ratio of pre-polymerization amount: 0.25 wt.%

The low density, low melt index polyethylene having the grade as indicated above (density 0.925 g/ml, MI 0.07) is one belonging to the field of polyethylene, which has been regarded as being impossible to be produced by the conventional solution process and slurry process.

EXAMPLE 16

An activated titanium component was prepared using magnesium hydroxychloride as a support and polymerization was conducted.

10 g of magnesium hydroxychloride were charged into a Kumagawa type extractor, extracted with titanium tetrachloride at its boiling temperature for 20 hours, then washed with n-hexane at its boiling temperature for 10 hours, dried under reduced pressure at 50° C. and thus, an activated titanium with a 0.5 wt.% Ti content (component (A)) was obtained.

The pre-polymerization and copolymerization were conducted using 0.20 g of the above component (A) in the same procedure as Example 1. 12.5 g of ethylene were pre-polymerized (in the amount of pre-polymerization, 62.5 g/g.(A)).

After 2.0 hours for polymerization, 973 g of an ethylene-butene-1 copolymer (butene-1 content 8.2 wt.%) were obtained.
Intrinsic viscosity: 1.23 dl/g
Number of ethyl groups: 21.0/1000 carbon atoms
Density: 0.925 g/ml
Bulk density: 0.37 g/ml
MI: 5.4
Catalytic activity: 2.43 kg/g.(A).hr or 487 kg/g.Ti.hr
Yield: 4.86 kg/g.(A) or 975 kg/g.Ti
Ratio of pre-polymerization amount: 1.28 wt.%.

EXAMPLE 17

The pre-polymerization and copolymerization were conducted in the same procedure as Example 1 except using propane as the copolymerization diluent.

After 2 hours for polymerization, 853 g of an ethylene-butene-1 copolymer (butene-1 content 7.8 wt.%) were obtained.
Intrinsic viscosity: 1.53 dl/g
Bulk density: 0.42 g/ml
Number of ethyl groups: 20.1/1000 carbon atoms
Density: 0.925 g/ml
MI: 1.80
Catalytic activity: 10.7 kg/g.(A).hr or 533 kg/g.Ti.hr
Yield: 21.4 kg/g.(A) or 1066 kg/g.Ti
Ratio of pre-polymerization amount: 0.29 wt.%.

Comparative Examples 5-6

For showing that the limitation of the prepolymerization amount as defined in this invention has a critical nature, a comparison was made with Example 1. The pre-polymerization and copolymerization of ethylene and butene-1 were conducted in the same manner as Example 1 except using the pre-polymerization amounts as set forth in Table 4.

The polymerization results show that owing to the deterioration of the slurry property, the diffusion of ethylene becomes worse in the course of copolymerization and thus the polymerization activity is reduced. Though the resulting polymer particles were too sticky to exactly measure a bulk density, it gave a lower value at an approximate estimate as set forth in Table 4.

0.35 g/ml by copolymerizing ethylene and an α-olefin, which comprises:
(1) using a catalyst consisting of (A) titanium and/or vanadium compounds selected from the transition metal component of a Ziegler catalyst supported with a magnesium compound and (B) an organoaluminum compound,
(2) subjecting ethylene to a pre-polymerization in a liquid diluent in the presence of said catalyst prior to in the copolymerization, the amount of ethylene to be prepolymerized being more than 50 g per 1.0 g of said catalyst component (A) and not more than 20% by weight of the entire amount of the ethylene and α-olefin monomers to be polymerized, and
(3) successively, conducting the copolymerization of ethylene and an α-olefin at temperatures of not higher than 100° C. in the presence of a low-boiling hydrocarbon diluent having a boiling point of not higher than 40° C.

2. The method according to claim 1 wherein the catalyst component (A) is one prepared by co-pulverizing the titanium and/or vanadium compounds, the magnesium compound and an additive.

3. The method according to claim 1 wherein the amount of ethylene to be pre-polymerized is in the range of 50 to 3000 g per 1 g of the component (A).

4. The method according to claim 1 wherein the copolymerization diluent is propane, n-butane, iso-butane, n-pentane, iso-pentane, cyclopropane or cyclobutane, or mixtures thereof.

5. The method according to claim 1 wherein the amount of α-olefin to be copolymerized is between about 0.5 and 12 weight % of the resulting copolymer.

6. The method according to claim 2, wherein said additive is selected from a siloxane polymer or an aluminum halide-ether complex.

7. The method according to claim 1, wherein said copolymer has a melt index of less than 0.1 measured in accordance with ASTM D-1238-65T (Test Condition E).

8. The method according to claim 1, wherein said diluent is propane.

9. The method according to claim 1, wherein said diluent is iso-butane.

10. The method according to claim 1, wherein said

TABLE 4

| Comparative Ex. No. | Amount of Pre-polymerization g | g/g·(A) | Yield of Polymer *(1) g | Catalytic Activity Kg/g·(A)·hr | Catalytic Activity Kg/g·Ti·hr | Yield of Polymer per g of Catalyst Kg/g·(A) | Yield of Polymer per g of Catalyst Kg/g·Ti | Bulk Density g/ml *(6) | Intrinsic Viscosity dl/g | Density g/ml | Ethyl Groups *(2) | MI | Remark |
|---|---|---|---|---|---|---|---|---|---|---|---|---|---|
| 5 | 0.2 | 5 | 520 (8.1) | 6.5 | 325 | 13.0 | 650 | (0.23) | 1.30 | 0.927 | 20.8 | 5.3 | Sticky polymer particles |
| 6 | 1.2 | 30 | 603 (9.1) | 7.5 | 377 | 15.1 | 754 | (0.25) | 1.31 | 0.926 | 23.1 | 5.3 | " |
| Ex. 1 | 2.5 | 62.5 | 1008 (9.6) | 12.6 | 630 | 25.2 | 1260 | 0.40 | 1.20 | 0.926 | 24.3 | 6.6 | Non-sticky polymer particles |

Note:
*(6) The parentheses mean an approximate value.

What we claim is:

1. A method for the production of a low density copolymers of ethylene and α-olefins having a density of 0.925 to 0.950 g/ml and a bulk density of more than diluent is n-butane.

11. The method according to claim 1, wherein said α-olefin is butene-1.

* * * * *